MINIATURE RESONANT REED RELAY

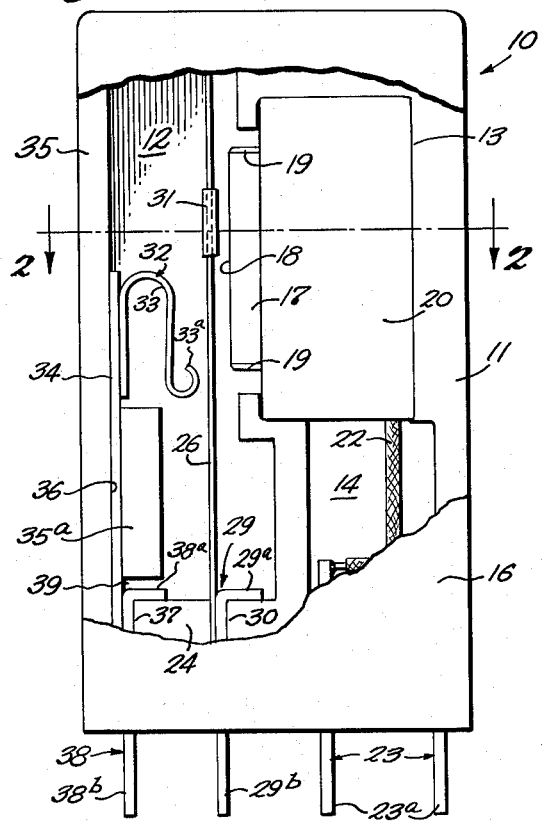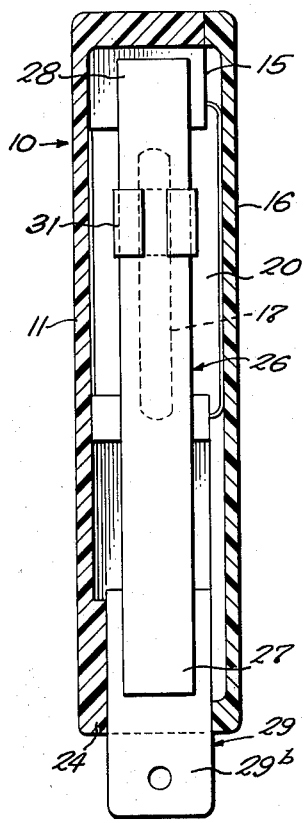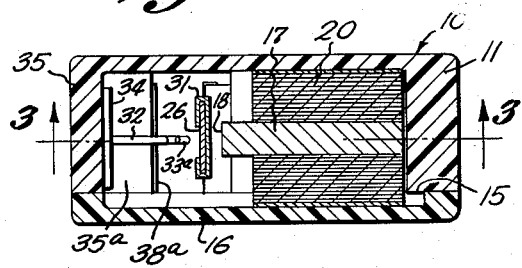
INVENTOR
Henry C. Rumm
BY Mason, Fenwick & Lawrence
ATTORNEYS Sept. 28, 1965      H. C. RUMM      3,209,100

Filed Aug. 8, 1963      2 Sheets-Sheet 2

INVENTOR
*Henry C. Rumm*

BY *Mason, Fenwick & Lawrence*
ATTORNEYS

United States Patent Office 3,209,100
Patented Sept. 28, 1965

3,209,100
MINIATURE RESONANT REED RELAY
Henry C. Rumm, Rochester, N.Y., assignor to Sargent and Greenleaf, Inc., Rochester, N.Y., a corporation of New York
Filed Aug. 8, 1963, Ser. No. 300,742
4 Claims. (Cl. 200—90)

The present invention relates in general to frequency selective electric switches, and more particularly to miniature magnetically driven vibrating reed devices of the type commonly known as resonant reed relays.

Resonant reed relays customarily comprise a tuned vibratile reed of paramagnetic material having a selected natural resonant frequency of vibration, together with a permanent magnet which sets up a field for the reed, an electromagnetic driving coil to which alternating current signals are applied to vary the total flux field so as to produce vibration of the reed when the frequency of the applied signal approximates the natural resonant frequency of the reed, and a stationary contact to be periodically engaged by the reed or by a contact on the reed when the reed vibrates with maximum amplitude responsive to an applied signal frequency corresponding to the selected resonant frequency characteristic of the reed. Such resonant reed relays have come into wide use in electronic communication equipment such as telemetering, radio-telephony, mobile radio receiver systems, paging systems, remote control systems, encoder and decoder networks, data processing and many other applications where it is desirable to selectively close circuits to activate one selected responder device out of a plurality of device in signal responder systems. As technology has advanced the miniaturization of electronic equipment, particularly with the advent of printed circuit board techniques and miniature transistors, the need has become more pressing for smaller size resonant reed relays than those heretofore commercially available. As the size of resonant reed relay units is decreased, problems arise in providing designs that can be commercially fabricated and assembled economically, establishing and adjusting after assembly precise frequency response characteristics, minimizing the effects of external physical vibrations and temperature variations on the frequency response characteristics of the reed, and attaining resonant frequencies of vibration over a wide range from about 67 cycles per second to about 1700 cycles per second with a standardized design.

An object of the present invention is the provision of a novel resonant reed relay having a construction which facilitates economic fabrication thereof, simplifies the structure, and permits attainment of miniature relay sizes with a wide range of resonant frequencies.

Another object of the present invention is the provision of a novel miniature resonant reed relay wherein all the parts are accurately located and supported in a single housing casting.

Another object of the present invention is the provision of a novel miniature resonant reed relay having improved calibration characteristics and enables adjustment of frequency in a minimum time.

Another object of the present invention is the provision of a novel miniature resonant reed relay having constant flux density properties with minimum change over a wide range of temperature.

Other objects, advantages, and capabilities of the present invention will become apparent from the following detail description, taken in conjunction with the accompanying drawings illustrating a preferred embodiment of the invention.

In the drawings:

FIGURE 1 is a side elevation of a miniature resonant reed relay construction in accordance with the present invention and viewed from the coverside thereof, portions of the cover being broken away to reveal the interior;

FIGURE 2 is a horizontal transverse section view of the resonant reed relay taken along the line 2—2 of FIGURE 1;

FIGURE 4 is a vertical section view taken along the line 4—4 of FIGURE 3;

Figure 3:
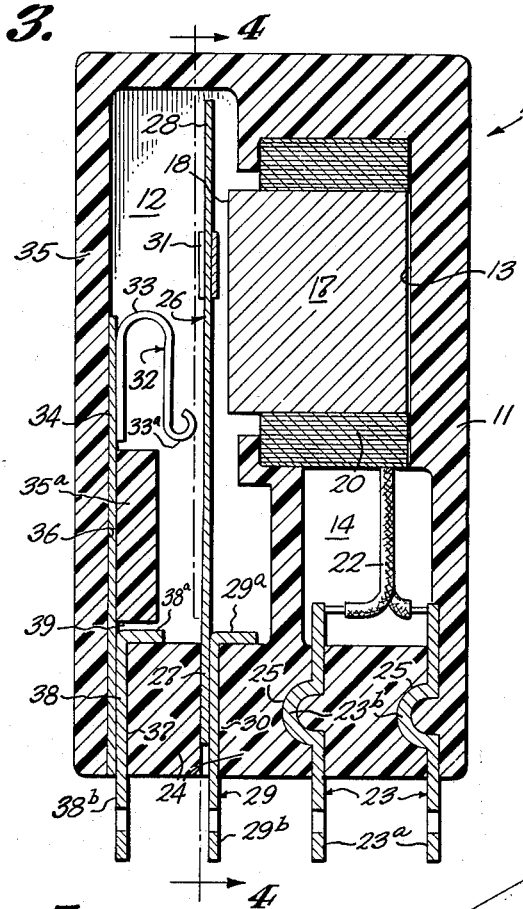
FIGURE 3 is a vertical section view of the resonant reed relay, taken along the line 3—3 of FIGURE 2.
Figure 5:
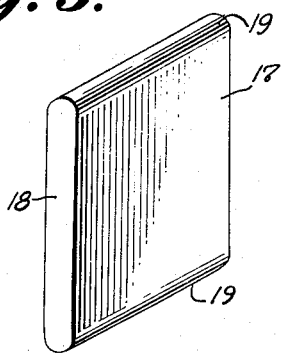
FIGURE 5 is a perspective view of the permanent magnet employed in the resonant relay.
Figure 6:
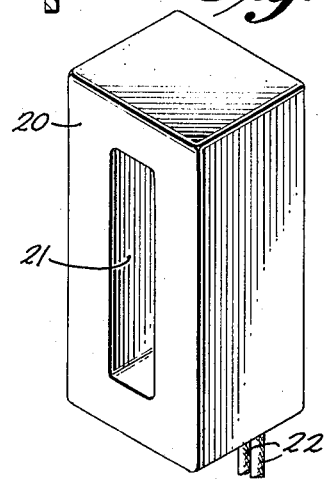
FIGURE 6 is a perspective view of the electro-magnetic drive coil employed in the resonant reed relay.

The resonant reed relay of the present invention in general comprises a molded housing formed of a single casting provided with internal cavities to accurately position and support all of the parts of the resonant reed relay, an elongated vibratory reed attached to a terminal member supported in the molded housing, an electromagnet driving coil surrounding a generally planiform permanent magnet arranged with a long narrow face adjacent the free end portion of the vibratory reed, a stationary contact resiliently mounted on a contact arm which is mounted on another terminal member supported in the housing, the terminal member together with additional terminal members connected to the driving coil forming externally projecting electrically conductive terminal plugs. The external resonance of the reed relay structure is maintained at a very high frequency far above the rated resonant frequencies of vibration of the reeds to be incorporated therein.

Referring to the drawings wherein like reference characters designate corresponding parts throughout the several figures the miniature resonant reed relay unit, designated generally by the reference character 10, comprises an outer rectangular housing 11 molded of a hard phenolic material, such, for example, as hard diallylphthalate, which is molded so as to have internal cavities 12, 13 and 14 for placement of the reed relay components so designed as to position each internal component in proper relation to the other components. The internal cavities extend only partially through the transverse thickness of the housing body 11 and open through the surface 15 of the housing body to be closed by a cover panel 16 molded of similar material as the body 11 and affixed to the surface 15 by a suitable adhesive after assembly.

A permanent magnet 17 in the shape of a thin planiform block having a narrow elongated pole face 18 and, in the preferred embodiment, rounded upper and lower edges 19, is arranged inside an electromagnetic driving coil 20 arranged in the general form of a rectangular tube having a central opening 21 dimensioned to receive the permanent magnet 17. In the preferred construction, the magnet 17 is made of a well known alnico material and is of a simple one piece construction. This magnet is magnetized so that its lines of force are essentially perpendicular to the pole face 18. The assembled permanent magnet 17 and electromagnetic driving coil 20 are supported in the cavity 13 of the housing body 11, which cavity is shaped to conform to the peripheral portions of the driving coil 20 and abut the end of the coil 20 aligned with the end of the permanent magnet 17 opposite the pole face 18, and embrace a portion of the opposite end of the coil 20. The driving coil 20 is wound parallel to its longest axis and is either potted or taped to hold its physical shape for insertion into the cavity 13. The coil and magnet assembly are rigidly held in the cavity 13 by a suitable adhesive. Coil leads 22 extend through the cavity 14 of the housing body 11 connecting with the cavity 13 and are joined to a pair of electrically conductive terminal members 23 having exposed portions 23a extending below the base wall 24 of the housing body 11 and having arcuate excursions 23b intermediate of the terminal members lying in correspondingly configurated recesses 25 in the base wall 24 of the housing body 11 to retain the terminal members in the desired position.

An elongated vibratory reed 26 extends through substantially the full height of the cavity 12 along a plane closely adjacent to and parallelling the flat pole face 18 of the magnet 17 and includes a lower end portion 27 and an upper end portion 28. The vibratory reed 26 is of rectangular cross section having considerably greater width than thickness and may be made of an electrically conductive material which will respond to variations in the magnetic field by vibrating to and fro relative to a stationary end thereof (the lower end 27 in the illustrated embodiment) and which has a very small temperature coefficient of expansion. The reed 26 is preferably plated with a precious metal and the lower end portion 27 thereof is rigidly attached to a terminal member 29 of electrically conductive material by means such as spot welding, the terminal member 29 being in turn securely affixed in the base wall 24 of the housing body 11 as by cement. In the preferred embodiment, the terminal member 29 is of an L-shaped configuration having a head portion 29a which bears against the upper surface of the base wall 24, and an elongated shank 29b to which the reed 26 is affixed adjacent the head 29a and which extends through the recess 30 in the base wall 24. The shank 29b of the terminal member is of greater length than the vertical thickness of the base wall 24 to leave an exposed portion below the base wall 24 externally of the housing 11. An adjustable tab 31 is provided on the vibratory reed 26, which is made, for example, of Phosphor bronze and which is placed on the reed near the upper free end thereof adjacent the magnet 17 to be adjustable along the longitudinal axis of the reed as needed to vary the operational characteristics of the relay. For example, if the frequency of the reed is to be lowered or raised, the position of the tab 31 may be adjusted along the reed so as to provide appropriate variation of the reed frequency.

A stationary contact 32 is resiliently supported on the opposite side of the reed 26 from the permanent magnet and drive coil assembly at a position to be periodically engaged by the vibratory reed when the latter is executing the maximum amplitude of reed excursions responsive to variation of the magnetic field. The stationary contact is preferably formed of a very small diameter contact wire 33 of resilient, electrically conductive material, preferably plated with a precious metal, at least in the zone directly engaged by the reed. The contact wire 33 is suitably configurated to have an enlarged contact portion and provide appropriate resiliency, as by producing a partial loop 33a at the end designed to be engaged by vibrating reed 26 and an arched intermediate portion designed so that the contact wire 33 is resonant only for high frequencies considerably above the maximum resonant frequency of vibration of the reed to be employed to thereby reduce contact bounce at both the low and high frequencies for which these reed relays are designed. The contacting wire 33 is securely attached to an elongated contact arm 34 of electrically conductive material such as Phosphor bronze, for example by spot welding. The contact arm 34 is in the form of a thin strip of rectangular cross section which is disposed flat against a vertical end wall 35 of the housing body 11 and extends through a suitable recess 36 conforming to the cross section of the contact arm 34, in the lateral extension 35a of the end wall 35 and into a corresponding recess 37 in the base wall 24. The upper end portion of the contact arm 34 lies in the cavity 12 while the lower end portion thereof is securely attached, as by spot welding or the like, to a terminal member 38 which may, like the terminal member 29, be of L-shaped character having a head 38a lying in a suitable recess 39 between extension 35a and the base wall 24 and the flat elongated shank 38b extending through the recess 37 and terminating in an exposed portion projecting below the base wall 24 for suitable connection to external conductors. Both the terminal members 38 and 29 are preferably held in their accommodating recesses by a suitable cement, which is likewise applied to the portion of the contact arm 34 lying in the recesses 36 and 37 and against the wall 35.

The exposed portions of each of the terminal members 23, 29 and 38 form male plug terminals which may be inserted into corresponding sockets of a female plug to make electrical connection with the circuitry with which the reed relay unit is to be associated. Each of the terminal members may be provided with a feed-through hole in the exposed portion thereof to make it possible to solder directly to a circuit using connecting wires, when desired.

The position and spacing of the vibratory reed 26 in relation to the magnet 17 is adjusted to produce the desired operational characteristics of the miniature resonant reed relay. For example, when the frequency and bandwidth is to be increased or decreased, the position of the reed 26 may be changed by bending the lower end portion thereof immediately above the base wall 24 closer or further from the magnet 17. The approximate resonant frequency desired in the reed relay is attained by selection of a reed of appropriate dimension to give the desired frequency and then by bending of the lower portion of the reed, if required, and then adjusting the position of the tab 31 so as to bring the resonant frequency of the reed precisely to the desired setting.

The stationary contact 32 is adjustable toward or away from the flat surface of the reed 26 by bending of the contact wire 33 to attain any desired degree of amplitude of reed excursion.

Preferably the external natural resonance of the reed relay structure is maintained at a very high natural frequency, and the transfer of vibrations from the housing itself is damped or absorbed by placing the entire miniature reed relay unit in a corresponding socket which in turn may be mounted against a larger flat surface or the housing itself may be mounted directly on its back against a larger surface by means of a strip extending from the larger surface around the reed relay housing. Also the reed relay unit due to its miniature size may be mounted on its back directly to a printed circuit board by means of a strap.

From the foregoing, it will be appreciated that the miniature resonant reed relay herein described wherein all of the components are mounted in a single housing and are precisely located relative to each other by the cavities molded in the housing and conforming to the shape of the relay parts to be received therein reduces the complexities of mass production assembly of reed relays and provides a unit which is effective against minor shocks and normal temperature variations. Such a reed relay construction permits a greatly expanded range of resonant frequency ratings as compared with conventional units so that a standardized construction may be used for either low or high frequencies within the range of frequencies normally employed for resonant reed relays. Further, the unit can be easily and reliably adjusted to provide for different operational characteristics under wide and different environmental conditions.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

I claim:

1. A miniature resonant reed relay comprising an elongated, flat vibratory reed of electrically conductive magnetic material, an electromagnetic assembly including an elongated permanent magnet core of generally planiform configuration extending along a core axis and having an exposed end portion terminating in a pole face and an electromagnetic coil wrapped axially about said magnet core and fixed relative thereto to form a generally rectangular tube, a shallow rectangular cast housing having first and second closed bottom cavities opening through one major face thereof connected by a communicating channel, said first cavity receiving said vibratory reed therein and accommodating maximum vibratory excursions of the reed, said second cavity being shaped to conform to diametrically opposite sides and end portions of the periphery of said coil to abut and restrain in position the electromagnet assembly with said exposed end portion of the magnet core extending through said communicating channel into said first cavity, a stationary electrically conductive contact in said first cavity located adjacent an opposite side of said reed from said magnet core to be periodically engaged by said reed during vibration thereof responsive to alternating currents of selected frequencies applied to said coil, a thin cover panel peripherally conforming to the periphery configuration of said housing fastened to said face to close said cavities, and means providing external electrical connections to said coil, reed and contact.

2. A miniature resonant reed relay comprising an elongated, flat vibratory reed of electrically conductive magnetic material, an electromagnetic assembly including an elongated permanent magnet of generally planiform configuration having an exposed end portion terminating in a substantially rectangular pole face whose major axis parallels the longitudinal axis of the reed and an electromagnetic coil wrapped about said magnet around an axis perpendicular to said pole face to form a generally rectangular tube surrounding the same, a shallow rectangular cast housing having a pair of parallel major faces and first and second cavities closed at one major face thereof and opening through the other major face connected by a communicating channel, said first cavity receiving said vibratory reed therein and accommodating maximum vibratory excursions of the reed, said second cavity being shaped to receive the coil in nested relation therein and having bounding surfaces engaging portions of the periphery of said coil to hold the electromagnet assembly against movement in the direction of said major axis and perpendicular to said pole face with said exposed end portion of the magnet extending through said communicating channel into said first cavity, a stationary electrically conductive contact in said first cavity located adjacent an opposite side of said reed from said magnet to be periodically engaged by said reed during vibration thereof responsive to alternating currents of selected frequencies applied to said coil, a thin cover panel peripherally conforming to the peripheral configuration of said housing fastened to said other major face to close said cavities, and means providing external electrical connections to said coil, reed and contact.

3. A miniature resonant reed relay comprising an elongated, flat vibratory reed of electrically conductive magnetic material, an electromagnetic assembly including an elongated permanent magnet of generally planiform configuration having an exposed end portion terminating in a substantially rectangular pole face whose major axis parallels the longitudinal axis of the reed and an electromagnetic coil wrapped about said magnet around an axis perpendicular to said pole face to form a generally rectangular tube surrounding the same, a shallow rectangular cast housing having a pair of parallel major faces and first and second cavities closed at one major face thereof and opening through the other major face connected by a communicating channel, said first cavity receiving said vibratory reed therein and accommodating maximum vibratory excursions of the reed, said second cavity being shaped to receive the coil in nested relation therein and having bounding surfaces engaging portions of the periphery of said coil to hold the electromagnet assembly against movement in the direction of said major axis and perpendicular to said pole face with said exposed end portion of the magnet extending through said communicating channel into said first cavity, a stationary electrically conductive contact unit in said first cavity including an elongated contact support strip and a contact wire fixed thereto located adjacent an opposite side of said reed from said magnet to be periodically engaged by said reed during vibration thereof responsive to alternating currents of selected frequencies applied to said coil, the thin cover panel peripherally conforming to the peripheral configuration of said housing fastened to said face to close said cavities, said housing having a base wall having a plurality of parallel openings extending therethrough communicating with said fixed cavity, terminal members rigidly fixed in and extending through said openings having externally exposed portions adapted to fit into connector plug sockets, and means securely mounting an end of said reed and of said contact support strip to respective ones of said terminal members within said openings.

4. A resonant reed relay as defined in claim 2 wherein said contact comprises an elongated, rectilinear contact support strip extending in spaced parallelism to said reed alongside a boundary wall of said first cavity and a bendable arched contact wire fixed at one end to said support and having a curled terminal configuration at its other end to be intermittently engaged by the reed during vibration thereof.

References Cited by the Examiner

UNITED STATES PATENTS 1,092,417    4/14    Williams.
1,768,750    7/30    Dicke _____ 200—91 X

FOREIGN PATENTS 942,408    5/56    Germany.

BERNARD A. GILHEANY, *Primary Examiner.*

ROBERT K. SCHAEFER, *Examiner.*